US006028372A

United States Patent [19]

West et al.

[11] Patent Number: 6,028,372

[45] Date of Patent: Feb. 22, 2000

[54] DAILY START OPERATION FOR REMOTE VEHICLE STARTERS

[75] Inventors: Sidney West, Alexandria; Mark Gottlieb, Annandale, both of Va.

[73] Assignee: Designtech International, Inc., Springfield, Va.

[21] Appl. No.: 09/025,250

[22] Filed: Feb. 18, 1998

[51] Int. Cl.[7] .............................. B60R 22/00; F02N 17/00

[52] U.S. Cl. .................. 307/10.6; 123/179.2; 290/38 C; 307/141.4

[58] Field of Search .................................. 307/10.1–10.6, 307/141, 141.4; 361/195–202; 123/179.1, 179.2, 179.3, 179.4; 180/287; 340/425.5, 426, 825.69, 825.72; 290/38 C

[56] References Cited

U.S. PATENT DOCUMENTS

| | | | |
|---|---|---|---|
| 4,200,080 | 4/1980 | Cook et al. | 123/179.2 |
| 4,227,588 | 10/1980 | Biancardi | 180/287 |
| 4,637,359 | 1/1987 | Cook | 307/10.1 |
| 5,129,376 | 7/1992 | Parmley | 307/10.6 |
| 5,519,260 | 5/1996 | Washington | 307/10.5 |

*Primary Examiner*—Richard T. Elms

*Attorney, Agent, or Firm*—Oblon, Spivak, McClelland, Maier & Neustadt, P.C.

[57] ABSTRACT

A control system for a remote vehicle starter which allows a remote vehicle starter to be activated at a preset time for a specific number of days after setting. According to the control operation, a setting sequence is detected. When the setting sequence is detected, a timer is started, which may be for example slightly less than twenty-four hours. Then, a vehicle is automatically when the timer expires. Such a control operation in the present invention allows a vehicle to be started automatically at the same time after an initial setting for a specific number of days.

15 Claims, 2 Drawing Sheets

DAILY START OPERATION FOR REMOTE VEHICLE STARTERS

BACKGROUND OF THE INVENTION

1. Field of the Invention

The present invention is directed to a control operation for a remote vehicle starter which allows a daily automatic setting to activate the remote vehicle starter.

2. Discussion of the Background

A remote vehicle starter is a unit which allows an operator to remotely start a vehicle from a distance. Most remote vehicle starters are sold with a dedicated remote control radio frequency system. Typically, a remote vehicle starter comes with a key-chain type transmitter which sends a signal to a receiver in a remote start unit. When an operator presses down on a specific button in the key-chain type transmitter, a signal is sent to the remote starter unit to automatically start the vehicle connected thereto.

Recently, remote vehicle starter units have also been available as an add-on system. Such add-on systems operate as in other remote vehicle starters, except that such add-on systems do not include their own dedicated radio frequency receiver. Instead, these add-on systems include an input wire which is tied to another system already installed in the vehicle. When this input wire is activated, this causes the remote vehicle starter to start the vehicle. A typical operation is to connect this add-on remote vehicle starter system to an existing remote keyless entry system factory installed into the vehicle. In such an add-on system an add-on unit is installed so that an input wire triggers the add-on unit to start the vehicle. Further, this add-on unit is triggered based on an indication from the factory remote keyless entry system. For example, such an add-on system may be installed to operate based on an operation in the factory remote keyless entry that when a vehicle operator pushes a door lock button of the remote keyless entry system, the vehicle's lock wire receives a signal to lock the door. This signal to lock the door of the vehicle could be utilized to activate the add-on remote vehicle starter, and to thereby start the vehicle.

Such remote vehicle starters suffer from a problem in that their transmitter and receiver systems have a limited range of operation, for example typically between 30 to 75 feet. That is, for an operator to remotely start their vehicle with a background remote vehicle starter, the operator must be within 30 to 75 feet of the vehicle. This type of distance provides adequate for most customers in most situations; however, such a limited operation range may still leave many operators unable to start their vehicles by remote control in certain situations. For example, an operator may be able to start their vehicle on a cold morning from their home when the vehicle is located right outside their home. However, a situation in an office parking lot may be different. An operator may have to walk out to an office parking lot and almost all the way to their vehicle after leaving their office before they are within an adequate range to remotely start their vehicle.

SUMMARY OF THE INVENTION

Accordingly, one object of the present invention is to provide a novel remote vehicle starter and control for a remote vehicle starter which allows operation of the remote vehicle starter outside of a range of the remote vehicle starter transmitter.

A more specific object of the present invention is to provide a novel remote vehicle starter and control for a remote vehicle starter which allows an operator on a schedule to provide a setting schedule to remotely start their vehicle.

In order to achieve these objectives, the operation of the present invention first detects a setting sequence. Further, when the setting sequence is detected, a timer is started. Then, the vehicle is automatically started on a predetermined indication of the timer based on the setting sequence. The timer may typically be set for a period just less than twenty-four hours so that if an operator is on a schedule, the vehicle is automatically started at the same time for a selected number of days.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
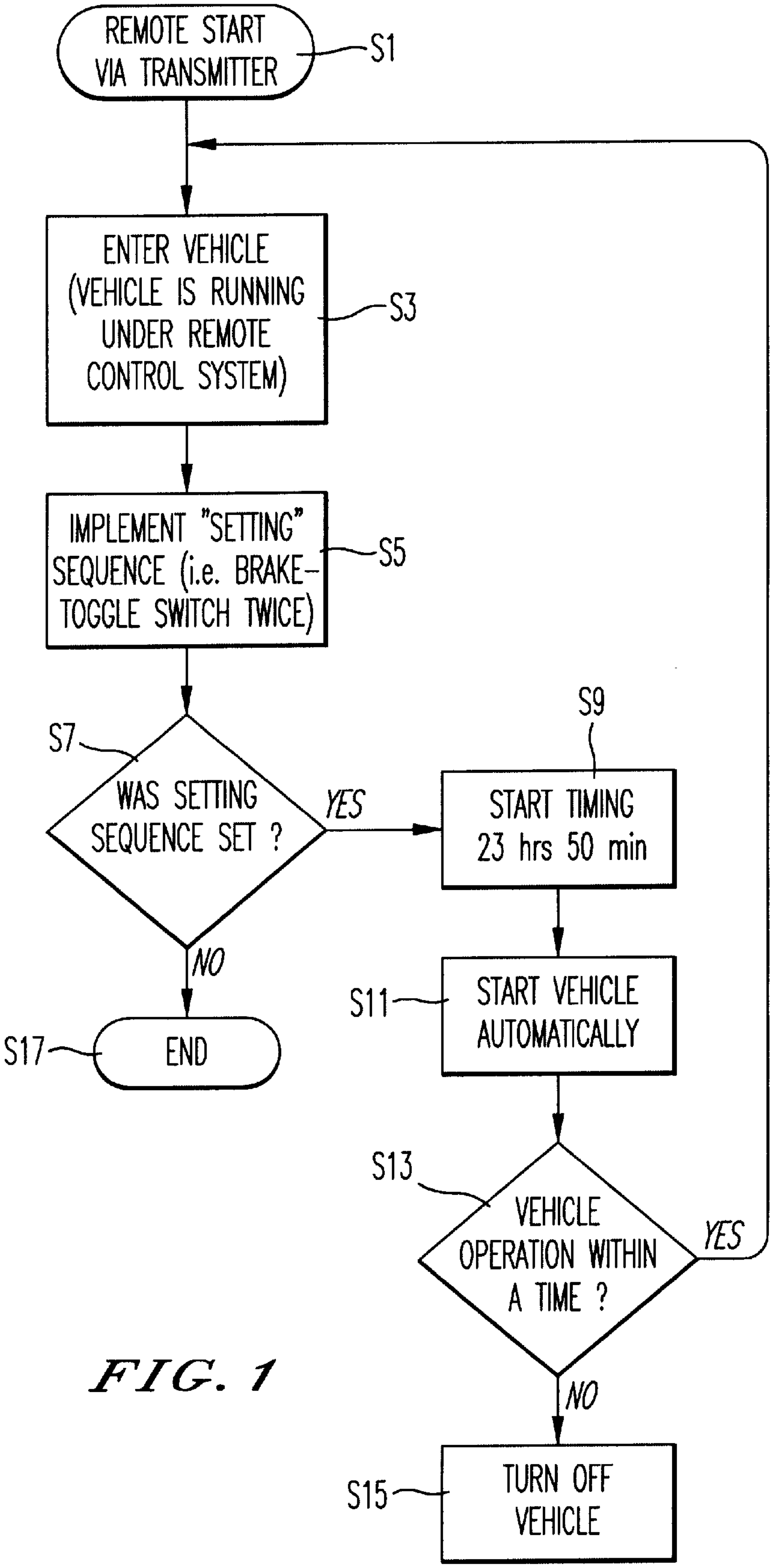
FIG. 1 is a flowchart showing a control operation in the present invention.

Referring now to FIG. 1, a control operation of the present invention is shown.

The present invention is a remote vehicle starter and control operation which may find application for vehicle operators who work on a specific schedule. That is, many vehicle operators may have a schedule in which they leave and/or return to home, work, etc. on a predictable schedule each day. As one example, a vehicle operator may start for work at 8:00 a.m. and leave work for home each day at 5:00 p.m.

A control operation of the present invention allows such an operator of vehicle with a remote vehicle starter to have the remote vehicle starter automatically start the vehicle approximately twenty-four hours later than on a previous day, for a desired number of future days.

As one concrete example of such an operation of the present invention, assume that a vehicle operator leaves their office at 5:00 p.m. everyday. In this situation, the control operation of a remote vehicle starter of the present invention operates as follows, and with reference to FIGS. 1 and 2.

Figure 2:
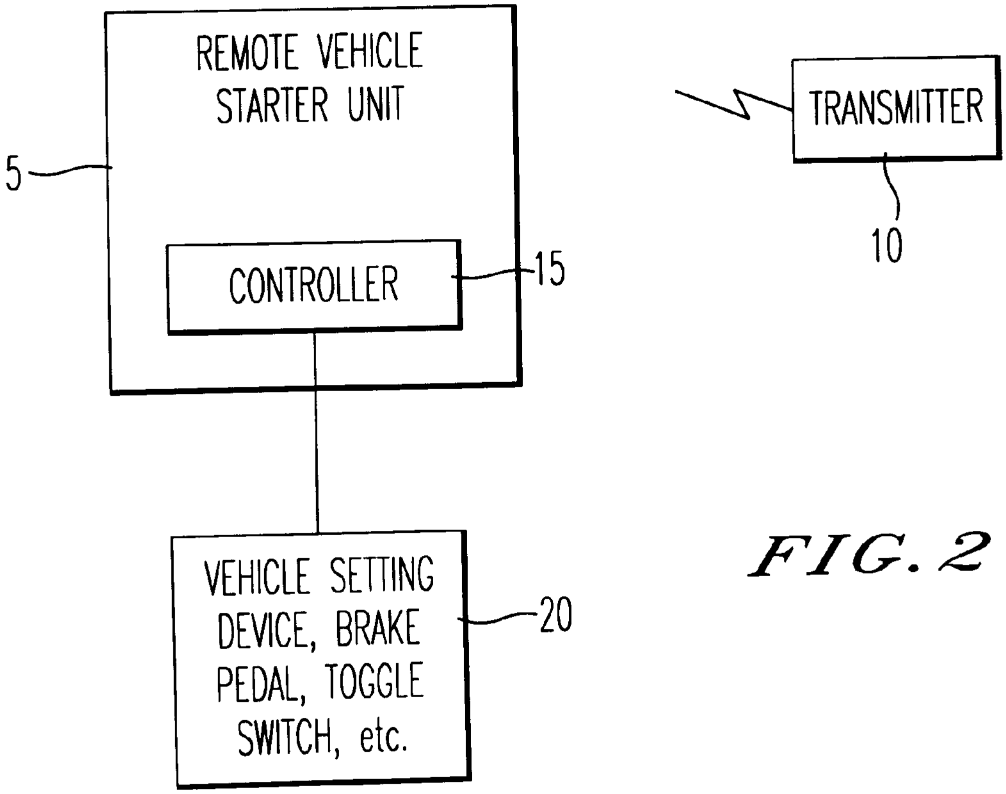
FIG. 2 shows a structure of the remote vehicle starting system of the present invention.

Initially, it is noted that FIG. 2 shows an overall view of the remote vehicle starting system of the present invention. As shown in FIG. 2 a remote vehicle starter 5 includes a controller 15. A transmitter 10 transmits signals to the remote vehicle starter 5 to remotely start a vehicle. This transmitter 10 may typically be a key-chain transmitter. Further, the controller 15 is connected to a vehicle setting device 20, which may be a break pedal and toggle switch combination, as discussed in further detail below.

As the vehicle operator approaches their vehicle on a first afternoon after they leave work, when they get within range of their vehicle, they remotely start the vehicle with their key-chain transmitter 10, see step S1 of FIG. 1. Then, when the operator enters the vehicle, see step S3, the operator performs a simple operation which indicates to the remote vehicle starter unit 5 to begin counting for approximately 24 hours, for example for 23 hours and 50 minutes. That is, when the operator gets into their vehicle, see step S3, the operator implements a setting sequence, see step S5, which indicates to the remote vehicle starter to begin counting a preset period of time, for example 23 hours and 50 minutes.

Then, in the step S7 it is determined whether the setting sequence was set. If the setting was not set, i.e., NO in step S7, the operation ends at step S17. However, if the setting sequence was previously set, i.e., YES in step S7, as discussed above a timer is set and starts counting 23 hours and 50 minutes in step S9. When this timing ends, in step S11 the vehicle is automatically started, and the operation then returns to step S3. The control steps are executed in the controller 15.

With such an operation of the present invention, the next day when the vehicle operator leaves the office at about their same time of 5:00 p.m., when the vehicle operator gets to their vehicle, the vehicle will already have been running for approximately 10 minutes. At this time, the vehicle operator can perform the simple setting operation again in step S5 to set the remote vehicle starter for the next day's operation.

As one safety feature in the present invention, in a step S13 after the vehicle has been automatically started in S11, if the vehicle is not operated within a predetermined period of time, the vehicle is turned off in step S15. This operation ensures that if a schedule of an operator has changed, and the operator does not arrive at the vehicle at their scheduled time, the vehicle is not left running for an extended period of time. For example, this operation may turn the vehicle off 10 minutes after it has been started. The remote vehicle starter may also already include such a turn-off feature.

As noted above, in step S5 it is determined whether a setting sequence has been implemented in the vehicle setting device 20. One typical manner of implementing the setting sequence is to have an operator push a brake pedal after the operator enters the vehicle in step S3, and then within a few seconds, turn a control switch or a valet toggle switch on the dashboard, on the key-chain transmitter, etc., on and off a predetermined number of times. Furthermore, this setting operation in step S5 may allow the operator to set the number of following days the operator would like to have the daily start feature activated. For example, the vehicle operator could use the above-described procedure and toggle a switch on and off 1 to 5 times, to indicate the number of following days that the vehicle is to be automatically started at the same time.

This invention may be conveniently implemented using a conventional microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional components, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A method for controlling a remote vehicle starter, comprising the steps of:

detecting a setting sequence;

starting a timer when the setting sequence is detected, the timer being automatically set for a period of approximately twenty-four hours; and automatically starting a vehicle when the timer expires.

2. The method of claim 1, wherein the step of detecting the setting sequence detects a brake pedal of the vehicle being pressed and a toggle switch switched a predetermined number of times as the setting sequence.

3. The method of claim 1, wherein the set time period of the timer is a period of time which is less than twenty-four hours.

4. The method of claim 1, wherein the setting sequence sets a number of days the step of automatically starting the vehicle is to be repeated.

5. The method of claim 1, further comprising the step of turning off the vehicle if the vehicle is not operated within a predetermined period of time.

6. A remote vehicle starter including a controller for controlling the remote vehicle starter, comprising:

means for detecting a setting sequence;

means for starting a timer when the setting sequence is detected, the timer being automatically set for a period of approximately twenty-four hours; and means of automatically starting a vehicle when the timer expires.

7. The remote vehicle starter of claim 6, wherein the detecting means detects a brake pedal of the vehicle being pressed and a toggle switch switched a predetermined number of times as the setting sequence.

8. The remote vehicle starter of claim 6, wherein the set time period of the timer is a period of time which is less than twenty-four hours.

9. The remote vehicle starter of claim 6, wherein the setting sequence sets a number of days the step of automatically starting the vehicle is to be repeated.

10. The remote vehicle starter of claim 6, further comprising the step of turning off the vehicle if the vehicle is not operated within a predetermined period of time.

11. A remote vehicle starter including a controller executing the steps of:

detecting a setting sequence;

starting a timer when the setting sequence is detected, the timer being automatically set for a period of approximately twenty-four hours; and automatically starting a vehicle when the timer expires.

12. The remote vehicle starter of claim 11, wherein the step of detecting the setting sequence detects a brake pedal of the vehicle being pressed and a toggle switch switched a predetermined number of times as the setting sequence.

13. The remote vehicle starter of claim 11, wherein the set time period of the timer is a period of time which is less than twenty-four hours.

14. The remote vehicle starter of claim 11, wherein the setting sequence sets a number of days the step of automatically starting the vehicle is to be repeated.

15. The method of claim 11, further comprising the step of turning off the vehicle if the vehicle is not operated within a predetermined period of time.

* * * * *